(12) United States Patent
Zhong (10) Patent No.: US 12,079,443 B2
(45) Date of Patent: Sep. 3, 2024

(54) ICON DISPLAY METHOD AND APPARATUS, AND ELECTRONIC DEVICE

(71) Applicant: VIVO MOBILE COMMUNICATION CO., LTD., Guangdong (CN)

(72) Inventor: Yu Zhong, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/096,660

(22) Filed: Jan. 13, 2023

(65) Prior Publication Data

US 2023/0161450 A1 May 25, 2023

Related U.S. Application Data

(63) Continuation of application No. PCT/CN2021/106718, filed on Jul. 16, 2021.

(30) Foreign Application Priority Data

Jul. 17, 2020 (CN) .......................... 202010692530.2

(51) Int. Cl.
G06F 3/04817 (2022.01)
(52) U.S. Cl.
CPC ................. *G06F 3/04817* (2013.01)
(58) Field of Classification Search
CPC ....................................................... G06F 17/14
See application file for complete search history.

(56) References Cited

U.S. PATENT DOCUMENTS

| | | | |
|---|---|---|---|
| 2014/0317543 A1 | 10/2014 | Kim | |
| 2016/0266726 A1 | 9/2016 | Zhan et al. | |
| 2016/0349960 A1* | 12/2016 | Kumar | ............... G06F 3/04817 |
| 2017/0308226 A1* | 10/2017 | Yoo | .................... G06F 3/03545 |
| 2017/0357426 A1 | 12/2017 | Wilson et al. | |
| 2018/0364893 A1 | 12/2018 | Lin et al. | |
| 2019/0243527 A1* | 8/2019 | Kuribayashi | ....... G06F 3/04817 |
| 2019/0339860 A1 | 11/2019 | Chen et al. | |
| 2020/0117341 A1* | 4/2020 | Shim | ................... G06F 3/04842 |
| 2020/0133463 A1 | 4/2020 | Sun et al. | |
| 2020/0285377 A1* | 9/2020 | Hoefs | .................... G04G 21/06 |

FOREIGN PATENT DOCUMENTS

| | | |
|---|---|---|
| CN | 103809858 A | 5/2014 |
| CN | 104391623 A | 3/2015 |
| CN | 105404446 A | 3/2016 |
| CN | 106033292 A | 10/2016 |
| CN | 106406665 A | 2/2017 |
| CN | 106527854 A | 3/2017 |
| CN | 106651296 A | 5/2017 |
| CN | 106686236 A | 5/2017 |
| CN | 107734179 A | 2/2018 |

(Continued)

*Primary Examiner* — Di Xiao
(74) *Attorney, Agent, or Firm* — Price Heneveld, LLP (57) ABSTRACT

This application discloses an icon display method and apparatus, and an electronic device. The method includes: updating a display mode of an icon of a target application in a case that a target object satisfies a preset condition, where the target object includes at least one of the following: a system time, an event preset in the target application, a message received through the target application, and a status of the target application.

12 Claims, 3 Drawing Sheets

(56) References Cited

FOREIGN PATENT DOCUMENTS

| | | | |
|---|---|---|---|
| CN | 108322593 | A | 7/2018 |
| CN | 109542287 | A | 3/2019 |
| CN | 111857475 | A | 10/2020 |
| JP | 2014191458 | A | 10/2014 |
| JP | 2015201074 | A | 11/2015 |
| JP | 2019510303 | A | 4/2019 |

* cited by examiner

Calendar

FIG. 2c

Clock

ICON DISPLAY METHOD AND APPARATUS, AND ELECTRONIC DEVICE

CROSS-REFERENCE TO RELATED APPLICATIONS

This application is a continuation application of International Application No. PCT/CN2021/106718 filed on Jul. 16, 2021, which claims priority to Chinese Patent Application No. 202010692530.2, filed in China on Jul. 17, 2020, which are incorporated herein by reference in their entireties.

TECHNICAL FIELD

This application pertains to the field of mobile communications technologies, and specifically relates to an icon display method and apparatus, and an electronic device.

BACKGROUND

At present, with increasing popularity of electronic devices, types of application software for the electronic devices are becoming more diverse, and downloads of various application software are also increasing. An application software developer usually sets a fixed application icon for each piece of application software during development of application programs. After the electronic device downloads the application software, a corresponding application icon is displayed on a screen interface of the electronic device.

During the implementation process of this application, the inventors have found that at least the following problems exist in the prior art: icons of existing applications have fixed display patterns, and a user wanting to change an icon has to make it done manually, which is time-consuming and inconvenient.

SUMMARY

Embodiments of this application are intended to provide an icon display method and apparatus, and an electronic device, so as to resolve a prior-art problem that electronic devices cannot automatically change an application icon.

In order to resolve the foregoing technical problem, this application is implemented as follows:

According to a first aspect, an embodiment of this application provides an icon display method, including:

updating a display mode of an icon of a target application in a case that a target object satisfies a preset condition, where the target object includes at least one of the following: a system time, an event preset in the target application, a message received through the target application, and a status of the target application.

According to a second aspect, an embodiment of this application provides an icon display apparatus, including:

an updating module, configured to update a display mode of an icon of a target application in a case that a target object satisfies a preset condition, where the target object includes at least one of the following: a system time, an event preset in the target application, a message received through the target application, and a status of the target application.

According to a third aspect, an embodiment of this application provides an electronic device, where the electronic device includes a processor, a memory, and a program or instructions stored in the memory and capable of running on the processor, and when the program or the instructions are executed by the processor, the steps of the method according to the first aspect are implemented.

According to a fourth aspect, an embodiment of this application provides a readable storage medium, where a program or instructions are stored in the readable storage medium, and when the program or the instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

In the embodiments of this application, in a case that the target object satisfies the preset condition, the display mode of the icon of the target application is updated, where the target object includes at least one of the following: a system time, an event preset in the target application, a message received through the target application, and a status of the target application. In this way, the electronic device can automatically update the display mode of the target application based on the target object, not requiring the user to manually change the icon, thereby saving the user a time of changing the icon of the target application. This can also meet diverse needs of users and increase interest of a desktop or screen display of the electronic device.

DETAILED DESCRIPTION OF EMBODIMENTS

The following clearly describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is interchangeable in appropriate circumstances so that the embodiments of this application can be implemented in other orders than the order illustrated or described herein. In addition, in this specification and claims, "and/or" indicates at least one of connected objects, and the character "I" generally indicates an "or" relationship between associated objects.

The following describes in detail an icon display method provided in the embodiments of this application by using specific embodiments and application scenarios thereof with reference to the accompanying drawings.

Figure 1:
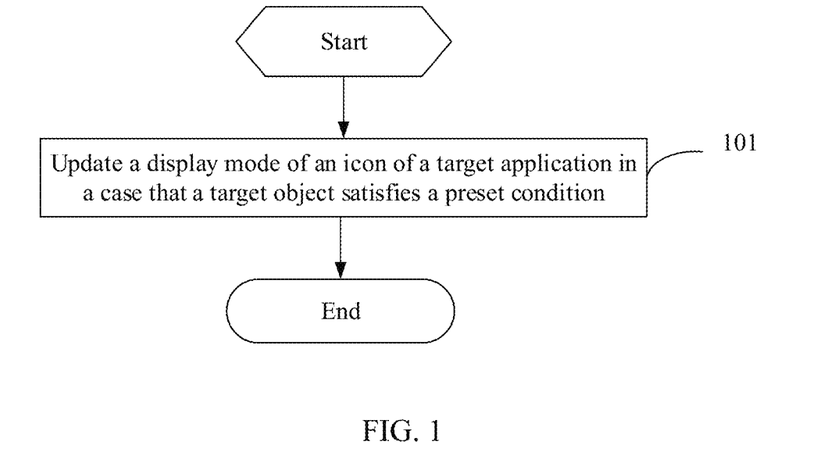
FIG. 1 is a flowchart of an icon display method according to an embodiment of this application.

FIG. 1 is a flowchart of an icon display method according to an embodiment of this application. As shown in FIG. 1, the icon display method in this embodiment is applied to an electronic device and includes the following steps.

Step 101: Update a display mode of an icon of a target application in a case that a target object satisfies a preset condition, where the target object includes at least one of the following: a system time, an event preset in the target application, a message received through the target application, and a status of the target application.

Specifically, the system time may be a time in a designated time zone obtained by the electronic device from a network, a time in a time zone where the electronic device is located, a time of a timer built in the electronic device, or a time displayed by the electronic device, which is not limited herein. The system time may include one or more of time or date. The event preset in the target application can be understood as a note event. The note event may be an event recorded by a user in a memo, a notepad, or a calendar, or may be an event that the electronic device automatically creates based on a national holiday or an anniversary, which is not limited herein.

The target application may be an album application, a weather application, a calendar application, a clock application, a shopping application, a financial management application, an App store application, a theme store application, a game application, a video application, a music playing application, or the like that is installed in the electronic device. The status of the target application may be a current running state of the target application, a recording state of the application, a notification state of the application, or the like. For example, for an audio playback application, playing is a running state, and paused is another running state. For a notepad application, when the notepad application includes recorded information, the notepad application is in a recording state, and an icon of the notepad application is displayed as a note icon with creases; and when the notepad application includes no recorded information, the notepad application is in a blank state, and the icon of the notepad application is displayed as a note icon without creases. For the shopping application, notification information being received and unread and notification information being not received are two different states.

Specifically, a detection result may be obtained through monitoring on the target object, and then whether the preset condition is satisfied is determined based on the detection result. Different target objects have different detection results. For example, if the target object includes the system time, the detection result may include a time or date displayed on the electronic device; if the target object includes the note event of the electronic device, the detection result may include a time corresponding to the note event or content of the note event; or if the target object includes the status of the target application, the detection result includes a running state of the target application, a recording state of the target application, a message received by the target application, or the like.

Figure 2A:
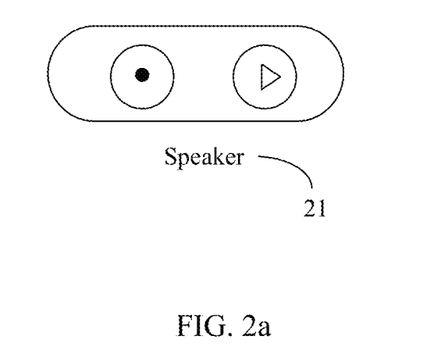
FIG. 2a to FIG. 2d are schematic diagrams of icons according to an embodiment of this application.
Figure 2B:
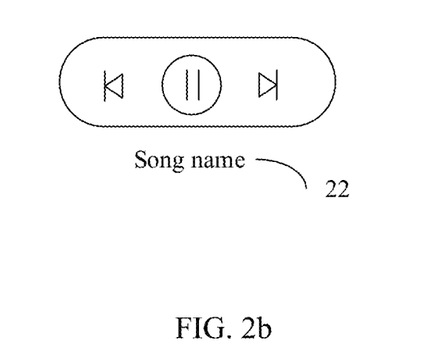

The display mode may display at least one of the icon of the target application and a component of the target application. The target application may be preset manually, or may be a default setting of the electronic device. The target application may be part of applications installed in the electronic device. The target application installed in the electronic device may be displayed in a form of component (also known as widget), and the component includes a pattern and/or a component name. For example, for components of a music application that are shown in FIG. 2a and FIG. 2b, a playing state is displayed in a form of component shown in FIG. 2a and "speaker" denoted by a reference numeral 21 is a component name; and a paused state is displayed in a form of component shown in FIG. 2b, the component name is replaced with a name of music being played, and "song name" denoted by a reference numeral 22 may be displayed as a specific song name. According to the method provided in this embodiment, the display mode of the icon or component of the target application on the electronic device can be changed, so as to meet diverse needs of users and increase interest of a desktop or screen display of the electronic device.

The electronic device may store a mapping relationship in advance, and the mapping relationship includes a correspondence between preset conditions, display modes, and icon signs. The mapping relationship may be downloaded from the Internet or be user-defined, which is not limited herein. The display mode is used for displaying an icon corresponding to an icon sign. The mapping relationship includes an icon sign of the icon, and the icon sign is a unique identifier of the icon. For example, the icon sign may be formed by splicing a storage location of the icon with a string of a file name, or the icon sign includes only a file name. In addition, the electronic device may also include an icon library. The icon library includes a plurality of icons, and each icon has a unique file name. The icon library may be downloaded from the Internet or may be user-defined. Further, icons in the icon library may alternatively be automatically generated by software on the electronic device, which is not limited herein.

The preset condition may be set based on an actual situation, and different preset conditions can be set for different target objects. If the target object satisfies the preset condition, a display mode and an icon sign that are corresponding to the preset condition can be found based on the mapping relationship, an icon with the icon sign may be obtained from the icon library based on the icon sign, and the icon is displayed according to the display mode. During displaying, only the icon of the target application may be displayed. The target application can be set in advance, and the target application may be part of the applications installed in the electronic device. For example, if the detection result is zero o'clock, an icon sign corresponding to zero o'clock in the mapping relationship is "midnight", and the target application is a clock application. In this case, the electronic device changes an icon of the clock application to an icon of a file name being "midnight" in the icon library, that is, updating an icon of an application installed in the electronic device.

In this embodiment, in a case that the target object satisfies the preset condition, the display mode of the icon of the target application is updated, where the target object includes at least one of the following: a system time, an event preset in the target application, a message received through the target application, and a status of the target application. In this way, the electronic device can automatically update the display mode of the target application based on the target object, not requiring the user to manually change the icon, thereby saving the user a time of changing the icon of the target application. This can also meet diverse needs of users and increase interest of a desktop or screen display of the electronic device.

In an embodiment of this application, the step 101 of updating a display mode of an icon of a target application in a case that a target object satisfies a preset condition includes:

in a case that the target object is a system time and the system time satisfies the preset condition, updating the display mode of the icon of the target application to a first display mode, where the first display mode corresponds to the system time and the first display mode is used for displaying a first icon.

Specifically, when the target object is the system time, the target application may be a first target application. The first target application may include at least one of an album application, a weather application, a calendar application, and a clock application. The first target application may be set by the user, or may be a default setting of the system, which is not limited herein. In this embodiment, the system time may be a time and/or date, and according to the system time, an icon of the first target application is displayed as an icon corresponding to the system time. For example, if icons corresponding to four seasons, namely spring, summer, autumn, and winter, are set for the calendar application in advance, the preset condition is spring, summer, autumn, or winter in this case. If the system time is February 15, because February 15 belongs to spring, an icon of the calendar application is then displayed as the icon of spring; or if the system time is June 15, because June 15 belongs to summer, the icon of the calendar application is then displayed as the icon of summer. In this way, the icon of the calendar application can be changed along with changing seasons to increase interest. The icons of spring and summer may have a same pattern but different colors, which is not limited herein.

For another example, 24 hours are divided into multiple intervals in advance, and the preset condition is one of the multiple intervals, for example, 24 intervals, one interval including one hour, and each interval corresponding to one icon. Starting from an icon corresponding to the first interval (corresponding to a time interval of 0 o'clock to 1 o'clock), colors of icons corresponding to subsequent intervals become darker in sequence. The first target application is the clock application, and in this way, an icon color of the clock application gradually becomes darker as time goes by. If the clock application includes components, one component may be correspondingly set for each interval. Starting from a component corresponding to the first interval (corresponding to the time interval of 0 o'clock to 1 o'clock), colors of components corresponding to subsequent intervals become darker in sequence. In this way, a component color of the clock application gradually becomes darker as time goes by.

In addition, a first time and a second time may alternatively be set by the user or the electronic device, and the first time is earlier than the second time. For example, the icon may be changed based on a sunrise time and a sunset time of a geographical location of the electronic device. For example, the user sets a sunrise time and a sunset time, or the electronic device obtains the sunrise time and sunset time from the network. A corresponding icon is set for a time range between the sunrise time and sunset time. Then, the electronic device can display the icon of the first target application (such as the clock application) based on a correspondence between times and icons, and the preset condition is a range between the first time and the second time.

In this embodiment, in a case that the target object is the system time and the system time satisfies the preset condition, the display mode of the icon of the target application is updated to the first display mode, where the first display mode corresponds to the system time and the first display mode is used for displaying the first icon. In this way, the electronic device can automatically update the display mode of the target application based on the system time, not requiring the user to manually change the icon, thereby saving the user a time of changing the icon of the target application. In addition, the first target application may be part of the applications installed in the electronic device, and the first target application can be set by the user, thereby increasing interest in changing display information of the first target application.

In an embodiment of this application, the step 101 of updating a display mode of an icon of a target application in a case that a target object satisfies a preset condition includes:

updating the display mode of the icon of the target application to a second display mode in a case that the target object is an event preset in the target application and the event satisfies the preset condition, where the second display mode corresponds to the event, the second display mode is used for displaying at least one of a second icon and an icon name, the second icon includes a preset mark, and the icon name includes content information of the event.

When the target object is an event preset in the target application (hereinafter referred to as a note event), the target application may be a second target application. The second target application may include at least one of a memo application, a notepad application, a calendar application, and a clock application. The second target application may be set by the user, or may be a default setting of the system, which is not limited herein. The note event may be set by the user, or may be a default setting of the system, which is not limited herein. For determining whether the note event satisfies the preset condition, a time may be determined based on the note event, and then whether the preset condition is satisfied based on the determined time. When the time is determined based on the note event, an occurrence time of the note event or a corresponding time of creating the note event may be obtained based on content of the note event. For example, the note event is created on a date in the calendar application, that is, the time is the occurrence time of the note event, and then whether the occurrence time satisfies the preset condition is determined. For example, if a preset time is 2 days ahead of time, it is determined whether the occurrence time is 2 days later than the current time; and if so, the display mode of the second target application is updated.

The preset condition may be set by the user based on an actual situation, or may be a default setting of the electronic device. For example, the preset condition may be that a time determined based on the note event is m hours earlier than the current time as compared with the current time, where m is a positive integer; or the preset condition may be that a time determined based on the note event is earlier than the current time by m hours but less than 24 hours, where m is a positive integer.

Figure 2C:
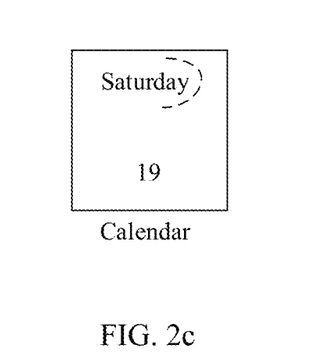
Figure 2D:
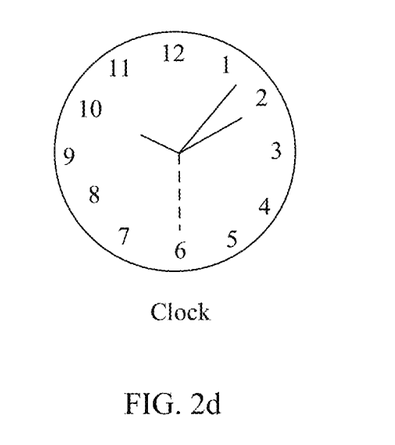

When the note event satisfies the preset condition, the display mode of the icon of the target application is updated to the second display mode, and the second display mode corresponds to the event, that is, the electronic device displays a second display mode that is of the second target application and corresponding to the note event. The second display mode is used for displaying at least one of a second icon and an icon name, the second icon includes a preset mark, and the icon name includes content information of the event, for example, the preset mark is denoted as a straight line or a curve line to serve as a reminder. For an icon of the calendar application shown in FIG. 2c, a dashed line in the figure is a preset mark. For an icon of the clock application shown in FIG. 2d, in three solid lines in the figure, the shortest line is the hour hand, the longest line is the second hand, and the last one is the minute hand. A dashed line in the figure is a preset mark, and a time denoted by the preset mark is a time determined based on the note event. When there is a preset mark on the icon of the clock application, such as the preset mark in FIG. 2d, the icon indicates that an alarm clock is set and turned on.

If times corresponding to multiple note events are the same, icon names of the second target application are displayed in sequence as content information of the multiple note events, or the content information of the multiple note events is simultaneously displayed as the icon name of the second target application.

In this embodiment, the display mode of the icon of the target application is updated to the second display mode in the case that the target object is an event preset in the target application and the event satisfies the preset condition, where the second display mode corresponds to the event, the second display mode is used for displaying at least one of the second icon and the icon name, the second icon includes a preset mark, and the icon name includes content information of the event. In this way, the electronic device can automatically update the display mode of the target application based on an event preset in the target application, not requiring the user to manually change the icon, thereby saving the user a time of changing the icon. In addition, the icon name includes the content information of the note event, and the pattern includes the preset mark, also serving as a reminder.

In an embodiment of this application, the updating the display mode of the icon of the target application to a second display mode in a case that the target object is an event preset in the target application and the event satisfies the preset condition includes:

in the case that the target object is an event preset in the target application, if the event includes N sub-events, obtaining N sub-times corresponding to the N sub-events; and for a target sub-time obtained from the N sub-times, if a current time is earlier than the target sub-time, and a time difference between the current time and the target sub-time is greater than or equal to a first preset value, updating the display mode of the icon of the target application to the second display mode, where the icon name includes content information of a first target sub-event corresponding to the target sub-time, and the second icon is an icon corresponding to the first target sub-event;

or, if the current time is later than the target sub-time, and a time difference between the current time and the target sub-time is less than a second preset value, updating the display mode of the icon of the target application to the second display mode, where the icon name includes content information of a second target sub-event corresponding to a next target sub-time, the second icon is the same as an icon corresponding to the second target sub-event, and the next target sub-time is a sub-time adjacent to the target sub-time and following the target sub-time in the N sub-times that are sorted in chronological order; where the target sub-time is a sub-time obtained from the N sub-times sequentially in chronological order.

Specifically, when the target object is an event preset in the target application, the target application may be the second target application. N sub-events correspond to N sub-times, and the N sub-times are sorted in order. Starting from a sub-time ranking first, whether the sub-time satisfies the preset condition is determined, and if the preset condition is satisfied, the display mode of the icon of the second target application is updated to the second display mode. The target sub-time is a sub-time obtained from the N sub-times sequentially in chronological order.

The preset condition includes that: the current time is earlier than the target sub-time, and the time difference between the current time and the target sub-time is greater than or equal to the first preset value, or the current time is later than the target sub-time, and the time difference between the current time and the target sub-time is less than the second preset value.

For a target sub-time currently obtained from N sub-times, if the current time is earlier than the target sub-time, and the time difference between the current time and the target sub-time is greater than or equal to the first preset value, the display mode of the icon of the target application is updated to the second display mode, and the second display mode is used for displaying at least one of the second icon and the icon name. The first preset value may be set based on an actual situation. For example, the first preset value may be 2 hours, and an icon associated with a sub-event corresponding to the target sub-time is an icon A. That is, for the sub-event corresponding to the target sub-time, in a case of being more than 2 hours, the electronic device changes an icon displayed for the second target application to the icon A. The icon name includes the content information of the first target sub-event corresponding to the target sub-time, the second icon is an icon corresponding to the first target sub-event, and the second icon may include a preset mark, for example, the preset mark is a straight line or a curve line, serving as a reminder. If there are one or more sub-events on the current day, a pattern of an icon of the second target application includes a same preset mark from 0 o'clock of the current day. When all the sub-events are completed or sub-times corresponding to the sub-events become historical times, the preset mark disappears.

For the target sub-time currently obtained from N sub-times, if the current time is not earlier than the target sub-time, or the time difference between the current time and the next target sub-time is less than the second preset value, the display mode of the icon of the target application is updated to the second display mode. The next target sub-time is a sub-time adjacent to the target sub-time and following the target sub-time in the N sub-times that are sorted in chronological order. The icon name includes the content information of the second target sub-event corresponding to the next target sub-time, and the second icon is an icon corresponding to the second target sub-event.

For example, if the current time is not earlier than the target sub-time, it indicates that the sub-event corresponding to the target sub-time has elapsed, or that an event next to the sub-event corresponding to the target sub-time is about to occur in 1 hour. In this case, the icon of the second target application is changed to an icon corresponding to the next event, for example, the icon name becomes content of the next event. Further, if target sub-times of the current day are all historical times, it indicates that there is no note event on the current day, and the icon name of the second target application may be displayed as the name of the application itself, for example, memo or calendar. In order to protect privacy of the user, the user may alternatively disable the function of displaying the icon name of the second target application as content of the sub-event.

In this embodiment of this application, in the case that the note event includes multiple sub-events, the N sub-times corresponding to the N sub-events are sorted in chronological order, and then the target sub-times are obtained sequentially from the earliest sub-time, so as to determine whether the preset condition is satisfied. If the preset condition is satisfied, the display mode of the icon of the target application is updated to the second display mode. In this way, the electronic device can automatically update the display mode of the icon of the target application based on the sub-event of the note event, not requiring the user to manually change the icon, thereby saving the user a time of changing the icon.

In an embodiment of this application, the step 101 of updating a display mode of an icon of a target application in a case that a target object satisfies a preset condition includes:

in a case that the target object is a message received through the target application, updating a first current display mode of the icon of the target application to a third display mode, where the third display mode corresponds to the message, the third display mode is used for displaying a third icon, the first current display mode is used for displaying a fourth icon, and the third icon and the fourth icon are different in at least one of pattern, color, and shape.

In the case that the target object is a message received by the target application, the target application may be a third target application. The third target application includes an application with a notification receiving function, such as an information application, a shopping application, a wealth management application, an App store application, a theme store application, a game application, a video application, or a music playing application.

For an application having the function of receiving notifications, notification information being received and unread and notification information being not received are two different states. When notification information is received, a badge may be set on an icon of the third target application, and the badge is a notification information count.

For example, when there is unread notification information, the icon of the third target application, for example, an icon of an application having a notification capability such as App store, theme store, or game center, is changed in shape, color, or pattern. A change in pattern is reflected in the icon before and after change, that is, the pattern remains the same and only a display angle of the pattern changes, for example, being rotated by a specific angle, or after being rotated, the pattern turning toward an information prompt count in the upper right corner of the icon. For mall-like icons such as App store, theme store, and game center, when there is unread notification information, a store door in the icon is opened or an opening of a shopping bag becomes larger, with content inside being seen along with light. That is, the change in shape, color, or angle may be used to prompt the user that the current state of the third target application changes.

In this embodiment of this application, in a case that the target object is a message received through the target application, the first current display mode of the icon of the target application is updated to the third display mode, and the third display mode corresponds to the message. The third display mode is used for displaying the third icon, the first current display mode is used for displaying the fourth icon, and the third icon and the fourth icon are different in at least one of pattern, color, and shape. In this way, the electronic device can automatically update the first current display mode of the icon of the target application based on the message received by the target application, not requiring the user to manually change the icon, thereby saving the user a time of changing the icon. In addition, the user may also learn about a status of the third target application based on the icon of the third target application, which is convenient and intuitive. This helps the user to know a running state of the third target application in a timely manner.

In an embodiment of this application, the step 101 of updating a display mode of an icon of a target application in a case that a target object satisfies a preset condition includes:

in a case that the target object is a status of the target application, updating a second current display mode of the icon of the target application to a fourth display mode, where the fourth display mode corresponds to the status of the target application, the fourth display mode is used for displaying a fifth icon, the second current display mode is used for displaying a sixth icon, and the fifth icon and the sixth icon are different in at least one of pattern, color, and shape.

The third target application may further include a folder application, a notepad application, a memo application, and the like.

In the case that the target object is a status of the target application, the target application may be a fourth target application. A status of an application of the electronic device can be understood as a current running status of the application. For example, for an audio playback application, playing is a running state, and paused is another running state. Other examples are a non-running state and a background running state. When the fourth target application is in a non-running state, the sixth icon is displayed for the fourth target application, and when the fourth target application is in a background running state, the fifth icon is displayed for the fourth target application, where the sixth icon has the same pattern as the fifth icon, different in color. Based on a color of an icon of the fourth target application, the user may determine whether the fourth target application is in a background running state, so that the user can learn about applications being in a background running state on the electronic device, which is convenient and intuitive.

The status of the application of the electronic device may alternatively be a recording state of the application, a notification state of the application, or the like. For the notepad application, when the notepad includes recorded information, the notepad application is in a recording state, and when the notepad includes no recorded information, the notepad application is in a blank state.

The fourth target application may alternatively be an audio playback application, a calendar widget application, a clock widget application, or the like. The fourth target application includes a component (also referred to as a widget). To be specific, on the electronic device, before being started, the fourth target application is displayed in a form of a display component, or after being started, the fourth target application is displayed in a form of a display component. For the fourth target application including a display component, in order to enrich the display of the application on the electronic device, a display style of the display component of the fourth target application is set in this embodiment.

Different applications have different status information. For example, for the display component of the audio playback application, the status information of the audio playback application includes being playing, a name of an audio being played, and the like; and the status information of the audio playback application also includes being paused. If the status information of the audio playback application is being playing, a name of the display component of the audio playback application is set to be the name of the audio, that is, the component name is determined based on the status information. In addition, a pattern of the display component may alternatively be set, so as to increase interest of displaying the component.

In this embodiment, in the case that the target object is the status of the target application, the second current display mode of the icon of the target application is updated to the fourth display mode. The fourth display mode corresponds to the status of the target application, the fourth display mode is used for displaying the fifth icon, the second current display mode is used for displaying the sixth icon, and the fifth icon and the sixth icon are different in at least one of pattern, color, and shape. In this way, the electronic device can automatically update the display mode of the icon of the target application based on the status of the target application, not requiring the user to manually make a change, thereby saving the user a time of changing the display style of the component.

It should be noted that, for the icon display method provided in the embodiments of this application, the execution body may be an icon display apparatus, or a control module for executing the icon display method in the icon display apparatus. In the embodiments of this application, the icon display method provided in the embodiments of this application is described by using the icon display method being executed by the icon display apparatus as an example.

Figure 3:
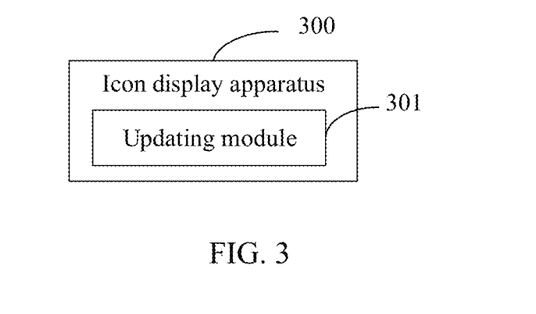
FIG. 3 is a structural diagram of an icon display apparatus according to an embodiment of this application.

As shown in FIG. 3, an embodiment of this application provides an icon display apparatus 300, including:

an updating module 301, configured to update a display mode of an icon of a target application in a case that a target object satisfies a preset condition, where the target object includes at least one of the following: a system time, an event preset in the target application, a message received through the target application, and a status of the target application.

In an embodiment of this application, the updating module 301 includes:

a first updating submodule, configured to: in a case that the target object is a system time and the system time satisfies the preset condition, update the display mode of the icon of the target application to a first display mode, where the first display mode corresponds to the system time and the first display mode is used for displaying a first icon.

In an embodiment of this application, the updating module 301 includes:

a second updating submodule, configured to update the display mode of the icon of the target application to a second display mode in a case that the target object is an event preset in the target application and the event satisfies the preset condition, where the second display mode corresponds to the event, the second display mode is used for displaying at least one of a second icon and an icon name, the second icon includes a preset mark, and the icon name includes content information of the event.

In an embodiment of this application, the second updating submodule is configured to:

in the case that the target object is an event preset in the target application, if the event includes N sub-events, obtain N sub-times corresponding to the N sub-events; and for a target sub-time obtained from the N sub-times, if a current time is earlier than the target sub-time, and a time difference between the current time and the target sub-time is greater than or equal to a first preset value, update the display mode of the icon of the target application to the second display mode, where the icon name includes content information of a first target sub-event corresponding to the target sub-time, and the second icon is an icon corresponding to the first target sub-event;

or, if the current time is later than the target sub-time, and a time difference between the current time and the target sub-time is less than a second preset value, update the display mode of the icon of the target application to the second display mode, where the icon name includes content information of a second target sub-event corresponding to a next target sub-time, the second icon is the same as an icon corresponding to the second target sub-event, and the next target sub-time is a sub-time adjacent to the target sub-time and following the target sub-time in the N sub-times that are sorted in chronological order; where the target sub-time is a sub-time obtained from the N sub-times sequentially in chronological order.

In an embodiment of this application, the updating module 301 includes:

a third updating submodule, configured to: in a case that the target object is a message received through the target application, update a first current display mode of the icon of the target application to a third display mode, where the third display mode corresponds to the message, the third display mode is used for displaying a third icon, the first current display mode is used for displaying a fourth icon, and the third icon and the fourth icon are different in at least one of pattern, color, and shape.

In an embodiment of this application, the updating module 301 includes:

a fourth updating submodule, configured to: in a case that the target object is a status of the target application, update a second current display mode of the icon of the target application to a fourth display mode, where the fourth display mode corresponds to the status of the target application, the fourth display mode is used for displaying a fifth icon, the second current display mode is used for displaying a sixth icon, and the fifth icon and the sixth icon are different in at least one of pattern, color, and shape.

The icon display apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (ultra-mobile personal computer, UMPC), a netbook, a personal digital assistant (personal digital assistant, PDA), or the like. The non-mobile electronic device may be a server, a network-attached storage (Network Attached Storage, NAS), a personal computer (personal computer, PC), a television (television, TV), a teller machine, a self-service machine, or the like. This is not specifically limited in the embodiments of this application.

The icon display apparatus in this embodiment of this application may be an apparatus having an operating system. The operating system may be an Android (Android) operating system, may be an iOS operating system, or may be another possible operating system. This is not specifically limited in the embodiments of this application.

The icon display apparatus 300 provided in this embodiment of this application is capable of implementing the processes implemented by the electronic device in the method embodiment in FIG. 1. To avoid repetition, details are not described herein again.

In the icon display apparatus 300 in this embodiment, in the case that the target object satisfies the preset condition, the display mode of the icon of the target application is updated, where the target object includes at least one of the following: a system time, an event preset in the target application, a message received through the target application, and a status of the target application. In this way, the electronic device can automatically update the display mode of the target application based on the target object, not requiring the user to manually change the icon, thereby saving the user a time of changing the icon of the target application. This can also meet diverse needs of users and increase interest of a desktop or screen display of the electronic device.

Optionally, an embodiment of this application further provides an electronic device, including a processor, a memory, and a program or instructions stored in the memory and capable of running on the processor. When the program or the instructions are executed by the processor, the processes of the foregoing embodiment of the icon display method are implemented, with the same technical effects achieved. To avoid repetition, details are not described herein again.

It should be noted that the electronic device in this embodiment of this application includes the aforementioned mobile electronic device and non-mobile electronic device.

Figure 4:
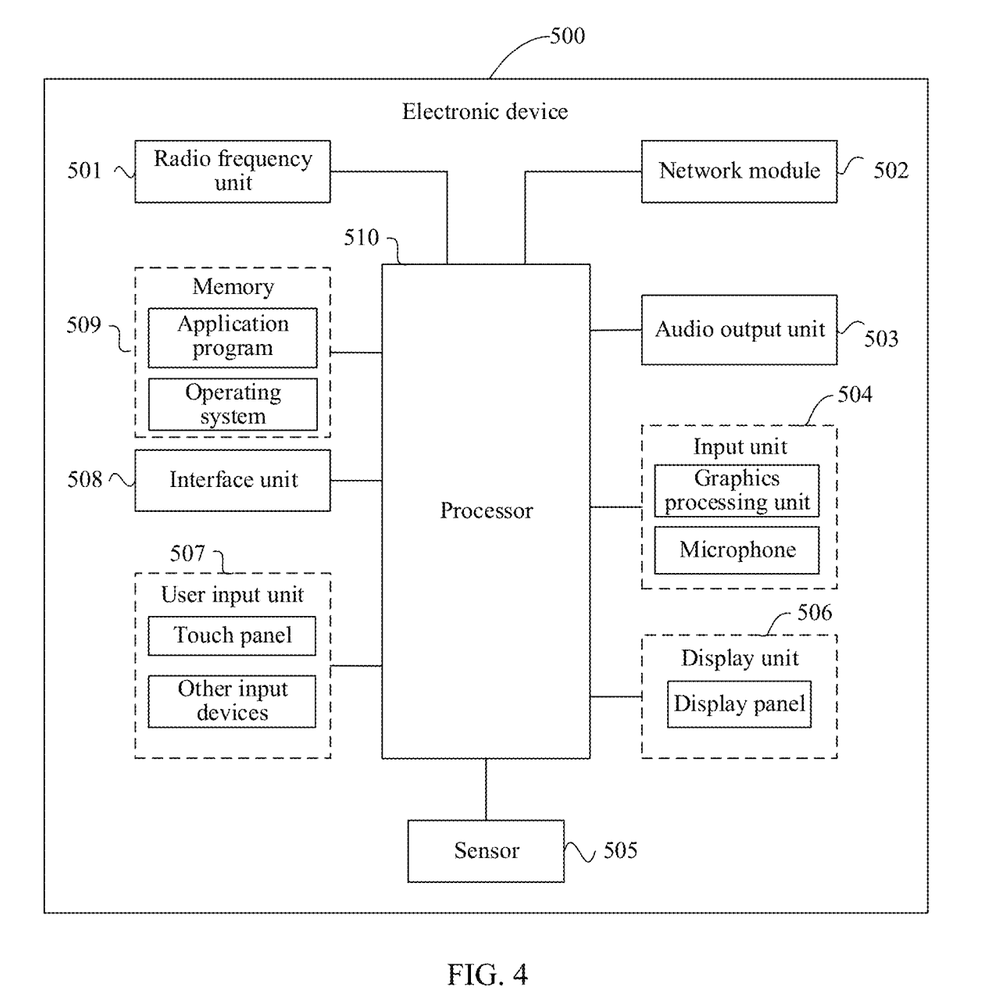
FIG. 4 is a structural diagram of an electronic device according to an embodiment of this application.

FIG. 4 is a schematic diagram of a hardware structure of an electronic device for implementing the embodiments of this application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the electronic device 500 may further include a power supply (such as a battery) for supplying power to the components. The power supply may be logically connected to the processor 510 through a power management system. In this way, functions such as charge management, discharge management, and power consumption management are implemented by using the power management system. The structure of the electronic device shown in FIG. 4 does not constitute any limitation on the electronic device. The electronic device may include more or fewer components than shown in the figure, or combine some of the components, or arrange the components differently. Details are not described herein again.

The processor 510 is configured to update a display mode of an icon of a target application in a case that a target object satisfies a preset condition, where the target object includes at least one of the following: a system time, an event preset in the target application, a message received through the target application, and a status of the target application.

Further, the processor 510 is further configured to: in a case that the target object is a system time and the system time satisfies the preset condition, update the display mode of the icon of the target application to a first display mode, where the first display mode corresponds to the system time and the first display mode is used for displaying a first icon.

Further, the processor 510 is further configured to: update the display mode of the icon of the target application to a second display mode in a case that the target object is an event preset in the target application and the event satisfies the preset condition, where the second display mode corresponds to the event, the second display mode is used for displaying at least one of a second icon and an icon name, the second icon includes a preset mark, and the icon name includes content information of the event.

Further, the processor 510 is further configured to: in the case that the target object is an event preset in the target application, if the event includes N sub-events, obtain N sub-times corresponding to the N sub-events; and for a target sub-time obtained from the N sub-times, if a current time is earlier than the target sub-time, and a time difference between the current time and the target sub-time is greater than or equal to a first preset value, update the display mode of the icon of the target application to the second display mode, where the icon name includes content information of a first target sub-event corresponding to the target sub-time, and the second icon is an icon corresponding to the first target sub-event;

or, if the current time is later than the target sub-time, and a time difference between the current time and the target sub-time is less than a second preset value, update the display mode of the icon of the target application to the second display mode, where the icon name includes content information of a second target sub-event corresponding to a next target sub-time, the second icon is the same as an icon corresponding to the second target sub-event, and the next target sub-time is a sub-time adjacent to the target sub-time and following the target sub-time in the N sub-times that are sorted in chronological order; where the target sub-time is a sub-time obtained from the N sub-times sequentially in chronological order.

Further, the processor 510 is further configured to: in a case that the target object is a message received through the target application, update a first current display mode of the icon of the target application to a third display mode, where the third display mode corresponds to the message, the third display mode is used for displaying a third icon, the first current display mode is used for displaying a fourth icon, and the third icon and the fourth icon are different in at least one of pattern, color, and shape.

Further, the processor 510 is further configured to: in a case that the target object is a status of the target application, update a second current display mode of the icon of the target application to a fourth display mode, where the fourth display mode corresponds to the status of the target application, the fourth display mode is used for displaying a fifth icon, the second current display mode is used for displaying a sixth icon, and the fifth icon and the sixth icon are different in at least one of pattern, color, and shape.

The electronic device in this embodiment updates the display mode of the icon of the target application in the case that the target object satisfies the preset condition, where the target object includes at least one of the following: a system time, an event preset in the target application, a message received through the target application, and a status of the target application. In this way, the electronic device can automatically update the display mode of the target application based on the target object, not requiring the user to manually change the icon, thereby saving the user a time of changing the icon of the target application. This can also meet diverse needs of users and increase interest of a desktop or screen display of the electronic device.

An embodiment of this application further provides a readable storage medium, where a program or instructions are stored in the readable storage medium. When the program or the instructions are executed by a processor, the processes of the foregoing icon display method embodiment are implemented, with same technical effects achieved. To avoid repetition, details are not described herein again.

The processor is a processor in the electronic device described in the foregoing embodiments. The readable storage medium includes a computer-readable storage medium, for example, a computer read-only memory (Read-Only Memory, ROM), a random access memory (Random Access Memory, RAM), a magnetic disk, or an optical disc.

An embodiment of this application further provides a chip, where the chip includes a processor and a communications interface, the communications interface is coupled to the processor, and the processor is configured to run a program or instructions to implement the foregoing icon display method embodiments, with the same technical effects achieved. To avoid repetition, details are not repeated herein.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element preceded by the statement "includes a . . . " does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, a person skilled in the art may clearly understand that the method in the foregoing embodiments may be implemented by software with a necessary general hardware platform. Certainly, the method in the foregoing embodiments may alternatively be implemented by hardware. However, in many cases, the former is a preferred implementation. Based on such an understanding, the technical solutions of this application essentially or a part thereof that contributes to the prior art may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other manners without departing from the essence of this application and the protection scope of the claims, and all such manners shall fall within the protection scope of this application.

What is claimed is:

1. An icon display method, comprising:
   updating a display mode of an icon of a target application in a case that a target object satisfies a preset condition, wherein the target object comprises at least one of the following: a system time, an event preset in the target application, a message received through the target application, and a status of the target application;
   wherein the updating a display mode of an icon of a target application in a case that a target object satisfies a preset condition comprises:
   updating the display mode of the icon of the target application to a second display mode in a case that the target object is an event preset in the target application and the event satisfies the preset condition, wherein the second display mode corresponds to the event, the second display mode is used for displaying at least one of a second icon and an icon name, the second icon comprises a preset mark, and the icon name comprises content information of the event;
   wherein the updating the display mode of the icon of the target application to a second display mode in a case that the target object is an event preset in the target application and the event satisfies the preset condition comprises:
   in the case that the target object is an event preset in the target application, if the event comprises N sub-events, obtaining N sub-times corresponding to the N sub-events; and
   for a target sub-time obtained from the N sub-times, if a current time is earlier than the target sub-time, and a time difference between the current time and the target sub-time is greater than or equal to a first preset value, updating the display mode of the icon of the target application to the second display mode, wherein the icon name comprises content information of a first target sub-event corresponding to the target sub-time, and the second icon is an icon corresponding to the first target sub-event;
   or,
   if the current time is later than the target sub-time, and a time difference between the current time and the target sub-time is less than a second preset value, updating the display mode of the icon of the target application to the second display mode, wherein the icon name comprises content information of a second target sub-event corresponding to a next target sub-time, the second icon is the same as an icon corresponding to the second target sub-event, and the next target sub-time is a sub-time adjacent to the target sub-time and following the target sub-time in the N sub-times that are sorted in chronological order; wherein
   the target sub-time is a sub-time obtained from the N sub-times sequentially in chronological order.

2. The method according to claim 1, wherein the updating a display mode of an icon of a target application in a case that a target object satisfies a preset condition comprises:
   in a case that the target object is a system time and the system time satisfies the preset condition, updating the display mode of the icon of the target application to a first display mode, wherein the first display mode corresponds to the system time and the first display mode is used for displaying a first icon.

3. The method according to claim 1, wherein the updating a display mode of an icon of a target application in a case that a target object satisfies a preset condition comprises:
   in a case that the target object is a message received through the target application, updating a first current display mode of the icon of the target application to a third display mode, wherein the third display mode corresponds to the message, the third display mode is used for displaying a third icon, the first current display mode is used for displaying a fourth icon, and the third icon and the fourth icon are different in at least one of pattern, color, and shape.

4. The method according to claim 1, wherein the updating a display mode of an icon of a target application in a case that a target object satisfies a preset condition comprises:
in a case that the target object is a status of the target application, updating a second current display mode of the icon of the target application to a fourth display mode, wherein the fourth display mode corresponds to the status of the target application, the fourth display mode is used for displaying a fifth icon, the second current display mode is used for displaying a sixth icon, and the fifth icon and the sixth icon are different in at least one of pattern, color, and shape.

5. An icon display apparatus, comprising: a memory, a processor and a computer program stored in the memory and executable by the processor, wherein the processor executes the computer program to:
update a display mode of an icon of a target application in a case that a target object satisfies a preset condition, wherein the target object comprises at least one of the following: a system time, an event preset in the target application, a message received through the target application, and a status of the target application;
wherein the processor executes the computer program to:
update the display mode of the icon of the target application to a second display mode in a case that the target object is an event preset in the target application and the event satisfies the preset condition, wherein the second display mode corresponds to the event, the second display mode is used for displaying at least one of a second icon and an icon name, the second icon comprises a preset mark, and the icon name comprises content information of the event;
wherein the processor executes the computer program to:
in the case that the target object is an event preset in the target application, if the event comprises N sub-events, obtain N sub-times corresponding to the N sub-events; and
for a target sub-time obtained from the N sub-times, if a current time is earlier than the target sub-time, and a time difference between the current time and the target sub-time is greater than or equal to a first preset value, update the display mode of the icon of the target application to the second display mode, wherein the icon name comprises content information of a first target sub-event corresponding to the target sub-time, and the second icon is an icon corresponding to the first target sub-event;
or,
if the current time is later than the target sub-time, and a time difference between the current time and the target sub-time is less than a second preset value, update the display mode of the icon of the target application to the second display mode, wherein the icon name comprises content information of a second target sub-event corresponding to a next target sub-time, the second icon is the same as an icon corresponding to the second target sub-event, and the next target sub-time is a sub-time adjacent to the target sub-time and following the target sub-time in the N sub-times that are sorted in chronological order; wherein
the target sub-time is a sub-time obtained from the N sub-times sequentially in chronological order.

6. The apparatus according to claim 5, wherein the processor executes the computer program to: in a case that the target object is a system time and the system time satisfies the preset condition, update the display mode of the icon of the target application to a first display mode, wherein the first display mode corresponds to the system time and the first display mode is used for displaying a first icon.

7. The apparatus according to claim 5, wherein the processor executes the computer program to: in a case that the target object is a message received through the target application, update a first current display mode of the icon of the target application to a third display mode, wherein the third display mode corresponds to the message, the third display mode is used for displaying a third icon, the first current display mode is used for displaying a fourth icon, and the third icon and the fourth icon are different in at least one of pattern, color, and shape.

8. The apparatus according to claim 5, wherein the processor executes the computer program to: in a case that the target object is a status of the target application, update a second current display mode of the icon of the target application to a fourth display mode, wherein the fourth display mode corresponds to the status of the target application, the fourth display mode is used for displaying a fifth icon, the second current display mode is used for displaying a sixth icon, and the fifth icon and the sixth icon are different in at least one of pattern, color, and shape.

9. A non-transitory readable storage medium, wherein the readable storage medium stores a program or instructions, the processor executes the program or instructions to:
update a display mode of an icon of a target application in a case that a target object satisfies a preset condition, wherein the target object comprises at least one of the following: a system time, an event preset in the target application, a message received through the target application, and a status of the target application;
wherein the processor executes the program or instructions to:
update the display mode of the icon of the target application to a second display mode in a case that the target object is an event preset in the target application and the event satisfies the preset condition, wherein the second display mode corresponds to the event, the second display mode is used for displaying at least one of a second icon and an icon name, the second icon comprises a preset mark, and the icon name comprises content information of the event;
wherein the processor executes the program or instructions to:
in the case that the target object is an event preset in the target application, if the event comprises N sub-events, obtain N sub-times corresponding to the N sub-events; and
for a target sub-time obtained from the N sub-times, if a current time is earlier than the target sub-time, and a time difference between the current time and the target sub-time is greater than or equal to a first preset value, update the display mode of the icon of the target application to the second display mode, wherein the icon name comprises content information of a first target sub-event corresponding to the target sub-time, and the second icon is an icon corresponding to the first target sub-event;
or,
if the current time is later than the target sub-time, and a time difference between the current time and the target sub-time is less than a second preset value, update the display mode of the icon of the target application to the second display mode, wherein the icon name comprises content information of a second target sub-event corresponding to a next target sub-time, the second icon is the same as an icon corresponding to the second target sub-event, and the next target sub-time is a sub-time adjacent to the target sub-time and following the target sub-time in the N sub-times that are sorted in chronological order; wherein the target sub-time is a sub-time obtained from the N sub-times sequentially in chronological order.

10. The non-transitory readable storage medium according to claim 9, wherein the processor executes the program or instructions to:

in a case that the target object is a system time and the system time satisfies the preset condition, update the display mode of the icon of the target application to a first display mode, wherein the first display mode corresponds to the system time and the first display mode is used for displaying a first icon.

11. The non-transitory readable storage medium according to claim 9, wherein the processor executes the program or instructions to:

in a case that the target object is a message received through the target application, update a first current display mode of the icon of the target application to a third display mode, wherein the third display mode corresponds to the message, the third display mode is used for displaying a third icon, the first current display mode is used for displaying a fourth icon, and the third icon and the fourth icon are different in at least one of pattern, color, and shape.

12. The non-transitory readable storage medium according to claim 9, wherein the processor executes the program or instructions to:

in a case that the target object is a status of the target application, update a second current display mode of the icon of the target application to a fourth display mode, wherein the fourth display mode corresponds to the status of the target application, the fourth display mode is used for displaying a fifth icon, the second current display mode is used for displaying a sixth icon, and the fifth icon and the sixth icon are different in at least one of pattern, color, and shape.

* * * * *